G. CAPRONI.
CONNECTING ELEMENT FOR AEROPLANES.
APPLICATION FILED FEB. 27, 1918.
1,370,583. Patented Mar. 8, 1921.
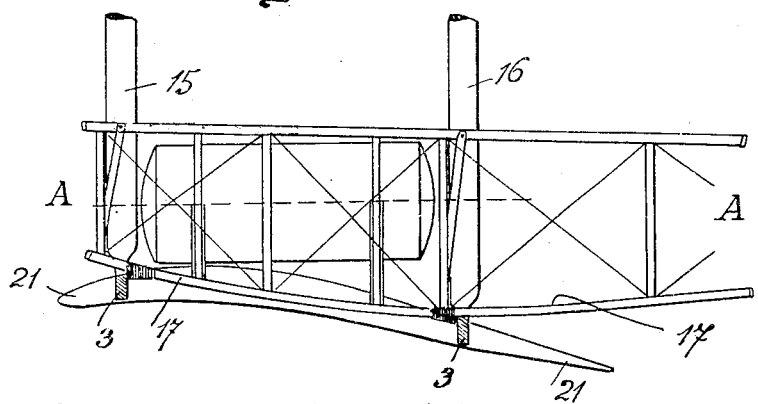
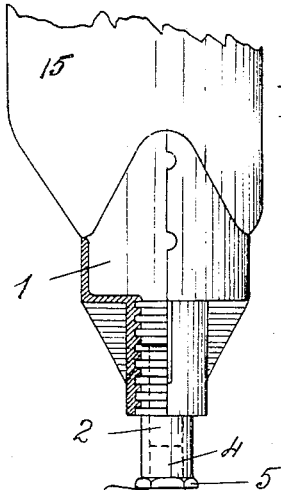
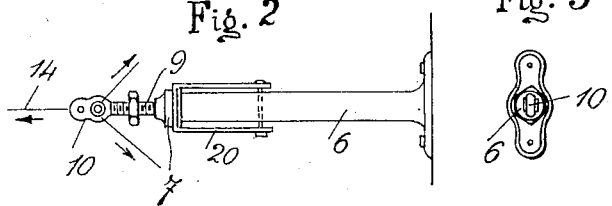
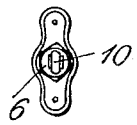
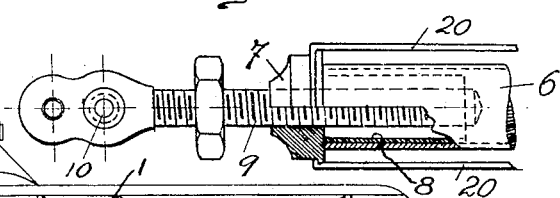
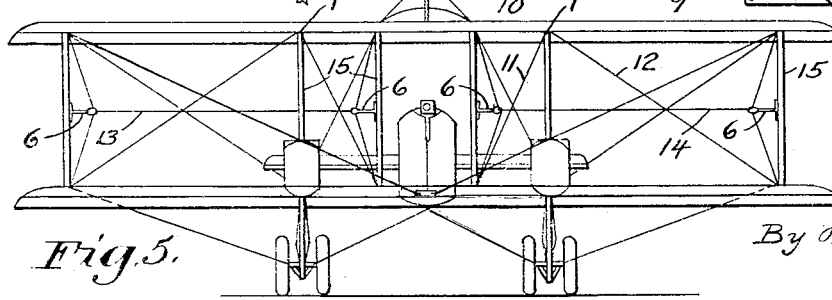
Inventor
G. Caproni.
By H. R. Kerslake
Atty

UNITED STATES PATENT OFFICE.

GIANNI CAPRONI, OF MILAN, ITALY.

CONNECTING ELEMENT FOR AEROPLANES.

1,370,583.  Specification of Letters Patent.  Patented Mar. 8, 1921.

Application filed February 27, 1918. Serial No. 219,528.

*To all whom it may concern:*

Be it known that I, GIANNI CAPRONI, a subject of the King of Italy, residing at 28 Via San Gregorio, Milan, Italy, have invented certain new and useful Improvements in Connecting Elements for Aeroplanes, of which the following is a specification.

The invention relates to improvements in flying machines. The object of the invention is to provide means whereby upon rapid inspection of the machine, loose parts may be rapidly rechanged or set right.

With this end in view the uprights, tie rods and cables of flying machines are provided with jointing and stretching means.

The invention will be better understood with reference to the annexed drawings which give by way of example two forms of construction of the jointing and stretching means.

Figure 1 is a sectional elevation of one example of a shortening device according to the present invention applied to an upright of the type employed in multiplane aeroplanes.

Figs. 2 and 3 are respectively a side view and an end view of the improved device applied to a means for tensioning a flexible cable.

Fig. 4 is a sectional elevation of the same device drawn to a larger scale.

Figs. 5 and 6 illustrate one manner of applying the improved devices, Fig. 6 being drawn to a larger scale.

The same reference numbers indicate the same parts in the various figures.

In Fig. 1 a socket is shown half in elevation and half in section. This socket forms the end of an upright and consists of a part —1— fixed to the upright and having an internal screw-thread into which there is adapted to be screwed a screw-threaded sleeve —2— which bears upon the longitudinal —3— and receives a pin —4— that is fixed to the longitudinal. The shortening of the upright is effected by causing the sleeve —2— to engage further into the socket —1—.

The improved device is operated by imparting by any suitable means rotary motion to the head —5— of the sleeve —2—.

Figs. 2, 3 and 4 show a lantern-like device adapted to be applied at the middle of an upright. In this example, —6— is a tube against the open end of which there bears a rotary nut —7— provided with an extension —8— that enters the cavity of the tube and is held in place by a stirrup-shaped fork —20—.

The nut —7— has an internal screw-thread receiving a screw-threaded stem —9— provided at its outer end with a device (for instance a double eyelet —10—) for fastening or attaching the cable or tie-rod. By rotating the nut —7— in one or the other direction by hand or by means of a special key, the tightening device will be lengthened or shortened accordingly, thereby tensioning or relaxing the wire or cable to which it is attached.

Fig. 5 shows by way of example one method of applying to a multiplane aeroplane the improved device shown in Fig. 1 applied to the end of an upright for tightening the cables —11— and —12—, and the improved device shown in Figs. 2, 3 and 4, for tightening or relaxing the tie-rods —13— and —14—.

These improved devices, in the particular case of their application to a machine such as that shown in Fig. 6, and generally to multiplane machines having one or more fuselages, have also the advantage of enabling the machine to be taken to pieces with all desired rapidity and facility.

As shown in Fig. 6, the uprights —15— and —16— fixed to the fuselage —A—, bear and press with their base longitudinal —17— upon the longitudinals —3— and —3— of the wing —21— of the aeroplane in such a manner as to connect the parts firmly together. The uprights —15— and —16— are provided with the improved device shown in Fig. 1, so that it will be understood that by operating the said device so as to shorten the uprights themselves, the fuselage —A— will be detached in such a manner as to be able to separate it from the machine immediately with all facility and rapidity.

It is to be understood that the constructional details of the improved devices may differ from those shown in the drawings without departing from the nature of the invention.

Likewise, the applications of the improved devices may vary according to the requirements of practice.

Having now particularly described and ascertained the nature of my said invention and in what manner the same is to be performed, I declare that what I claim is:—

1. An aeroplane structure comprising longitudinals, uprights arranged between the same and spacing the longitudinals apart, tie rods connecting intermediate portions of pairs of said uprights, cables connecting said longitudinals, and means for stretching the tie rods and cables.

2. An aeroplane structure comprising longitudinals, extensible uprights arranged between and spacing the longitudinals apart, tie rods connecting said uprights, cables connecting said longitudinals, and means for extending said uprights to stretch said cables.

3. An aeroplane structure comprising longitudinals, uprights arranged between the same and spacing the longitudinals apart, tie rods connecting intermediate portions of said uprights, means for stretching said tie rods, and inclined cables connecting said longitudinals.

4. In an aeroplane having a plurality of planes arranged one above the other, longitudinal bars for said planes, cables connecting the bars of one plane to the bars of the other plane, a fuselage extending between the planes, and bearing upon one of said planes, an upright fixed to the fuselage, and adjustable extensible means connecting the upright to the longitudinal bar of one plane, whereby the lengthening of said adjustable means will cause the fuselage to bear against the plane which it engages and the cables to be stretched.

In testimony whereof I have signed my name to this specification.

GIANNI CAPRONI.